(No Model.)

W. J. KAYSER.
DAMPER.

No. 454,967. Patented June 30, 1891.

Witnesses
Geo. W. Young
Jno. L. Condron

Inventor
William J. Kayser
By H. G. Underwood
Attorney

UNITED STATES PATENT OFFICE.

WILLIAM J. KAYSER, OF MILWAUKEE, WISCONSIN.

DAMPER.

SPECIFICATION forming part of Letters Patent No. 454,967, dated June 30, 1891.

Application filed August 18, 1890. Serial No. 362,307. (No model.)

*To all whom it may concern:*

Be it known that I, WILLIAM J. KAYSER, of Milwaukee, in the county of Milwaukee, and in the State of Wisconsin, have invented certain new and useful Improvements in Dampers; and I do hereby declare that the following is a full, clear, and exact description thereof.

My invention relates to dampers for the smoke-pipes of heating-stoves, furnaces, cooking-stoves, ranges, and all structures wherein combustion occurs for heating purposes; and my invention consists in certain peculiar and novel features of construction and arrangement, as hereinafter described, and pointed out in the appended claims.

Figure 1:
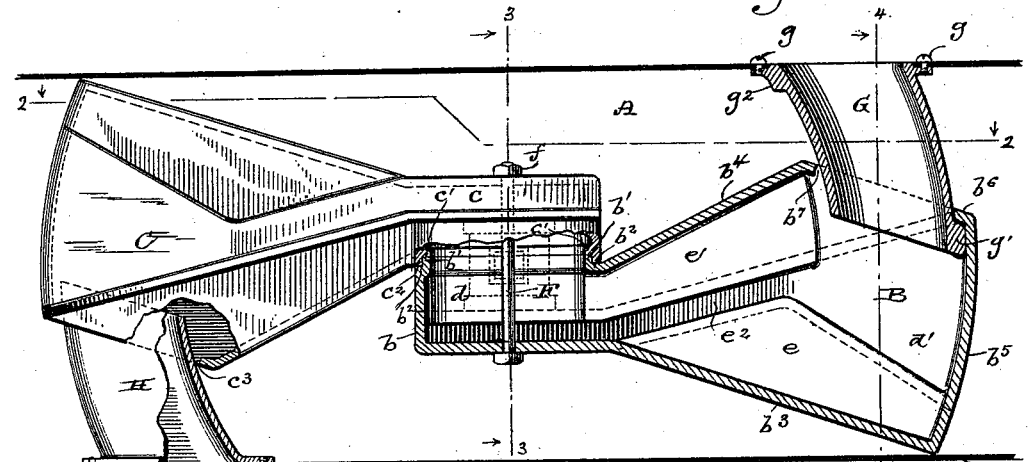
Figure 2:
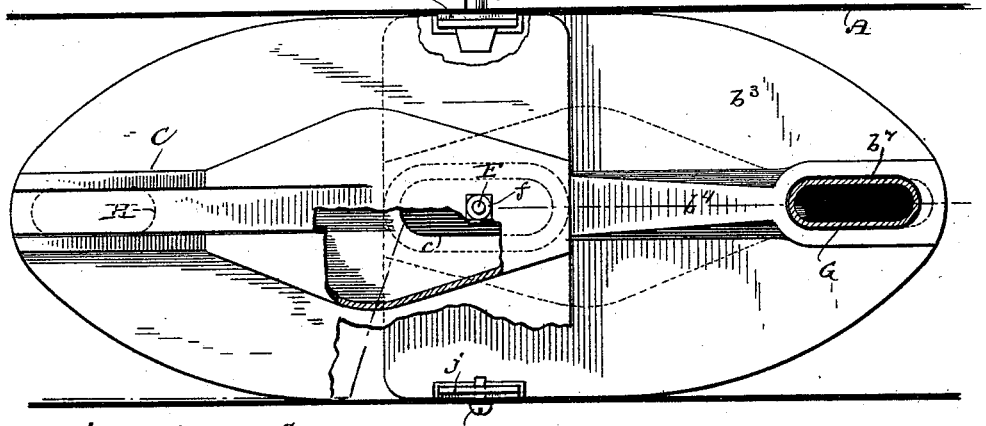
Figure 3:
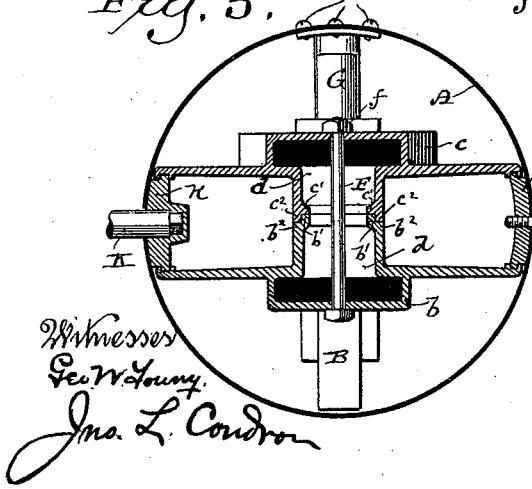
Figure 4:
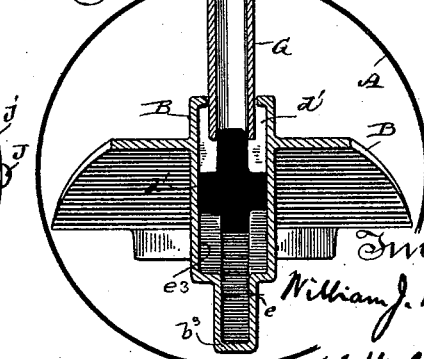

In the drawings, Figure 1 is a view, partly in side elevation and partly in longitudinal section, of my improved damper in operative position within a smoke-pipe. Fig. 2 is a similar view taken at right angles to the view in Fig. 1. Fig. 3 is a cross-section on the line 3 3 of Fig. 1. Fig. 4 is a cross-section on the line 4 4 of Fig. 1.

The object of my invention is to produce a damper which shall not only regulate the draft, and consequently the combustion of fuel, but which shall also serve as the means for distributing hot air into the apartment in which it may be located, thus economizing the consumption of fuel and increasing the heating capacity of the stove. This result I attain by virtue of the construction which I will now proceed to describe.

Referring to the drawings, A designates a section of pipe, which may be connected to a stove, range, furnace, or any other structure in which heat is generated by combustion of fuel. Within this pipe is located my improved damper, which is constructed as follows:

B C designate the two wings of the damper. The wing B is formed with hollow hub-section $b$, one side of which is open, and is provided at its edge with an inset marginal flange $b'$, thus leaving an external shoulder $b^2$ at the margin of the hub-section opening. From the hub-section $b$ the walls $b^3 b^4$ diverge outwardly, the wall $b^3$ extending to the segmental end $b^5$, while the wall $b^4$ extends to an inwardly-inclined wall $b^6$, containing an opening $b^7$, for a purpose to be hereinafter explained. Thus a chamber $d$ is formed within the hub-section $b$ and a chamber $d'$ is formed within the outer portion of the wing. Offsets $e$ $e'$ are preferably formed on the inner sides of the divergent walls of the wing, so as to leave a channel $e^2$, which communicates with the two chambers just mentioned. The wing C is constructed like the wing B, excepting that the margin of its hollow hub-section $c$ has an internal flange $c'$ and an external flange $c^2$ to form a close union with the hollow hub-section of wing B. An opening $c^3$ is formed in one side of the outer end of wing C, corresponding to but opposite from the opening $b^7$ of the wing B. These two wings are connected together by a bolt F, which extends through the hub-sections $b$ $c$, the wings being secured together by the nut $f$ of said bolt.

To opposite sides of the pipe-section A are secured, as by screws $g$ $h$, respectively, two curved inwardly-extending tubes G H, and these tubes are of such length as to always protrude into the openings $b^7 c^3$, respectively. The pivotal movement of the damper is toward and away from the outer ends of these tubes, respectively, and the inner ends of said tubes are either or both preferably formed with an external shoulder $g'$, (see Fig. 1,) which act as stops to limit the throw of the damper, the opposite movement of the damper being limited by shoulders $g^2$ on the inner end of one or both of said tubes.

The damper is pivoted at one side by a pivot-screw J, which passes through one side of the pipe and into a disk $j$, the margin of the latter being flanged to enter a marginally-grooved opening in the corresponding side of the damper. At its opposite side the damper is pivotally supported by a handle K, the stem of which is squared at its inner end to enter a similarly-shaped socket in a bearing-disk $k$, and the margin of this disk is also flanged to enter a marginally-grooved opening in the corresponding side of the damper. The edges of the damper are preferably elliptical in contour, as is best shown in Fig. 2.

From the above description the operation of the damper will be readily understood. The damper is turned one way or the other to either wholly or partially close the channel of the pipe A; but in whatever position the damper may be air will flow through it from one tube to the other, and thus be heated and distributed to the apartment in which the damper is located. Thus the consumption of fuel is easily regulated and the heating capacity of the stove is greatly increased.

By extending the smoke-pipe through several apartments and locating the damper or several dampers in each of such compartments all the effects of registers are produced.

Having thus described my invention, what I claim as new therein, and desire to secure by Letters Patent, is—

1. An improved damper composed of two hollow wings having each a hollow hub-section with communicable chambers and provided with air inlet and discharge ports, substantially as set forth.

2. The combination, with a hollow damper having air inlet and discharge ports, of air inlet and discharge tubes arranged to extend always within said ports, substantially as set forth.

3. The combination, with a smoke-pipe having inwardly-extending air inlet and discharge tubes, of a hollow damper pivoted within the pipe and having air inlet and discharge ports to receive said tubes, substantially as set forth.

In testimony that I claim the foregoing I have hereunto set my hand, at Milwaukee, in the county of Milwaukee and State of Wisconsin, in the presence of two witnesses.

WILLIAM J. KAYSER.

Witnesses:
H. G. UNDERWOOD,
LAWSON SCOTT.